(12) United States Patent
Mitsui

(10) Patent No.: US 8,917,405 B2
(45) Date of Patent: Dec. 23, 2014

(54) INFORMATION PROCESSING FOR GENERATING GRAPHICS DATA PROCESSIBLE BY A PRINTER

(75) Inventor: Akihiro Mitsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1174 days.

(21) Appl. No.: 12/158,793

(22) PCT Filed: Mar. 16, 2007

(86) PCT No.: PCT/JP2007/056118
§ 371 (c)(1),
(2), (4) Date: Jun. 23, 2008

(87) PCT Pub. No.: WO2007/108547
PCT Pub. Date: Sep. 27, 2007

(65) Prior Publication Data
US 2009/0097047 A1 Apr. 16, 2009

(30) Foreign Application Priority Data

Mar. 17, 2006 (JP) ................................. 2006-075548

(51) Int. Cl.
*G06F 3/12* (2006.01)
(52) U.S. Cl.
CPC .............. *G06F 3/1247* (2013.01); *G06F 3/121* (2013.01); *G06F 3/1256* (2013.01); *G06F 3/1208* (2013.01); *G06F 3/1234* (2013.01); *G06F 3/1285* (2013.01)
USPC .......... 358/1.14; 358/1.15; 358/1.18
(58) Field of Classification Search
CPC ................................................ H04N 1/00161
USPC ................. 715/200–277, 700–867
See application file for complete search history.

(56) References Cited

U.S. PATENT DOCUMENTS

| | | | |
|---|---|---|---|
| 2004/0111675 A1* | 6/2004 | Mori et al. | 715/513 |
| 2004/0263892 A1 | 12/2004 | Uchida | |
| 2005/0052662 A1* | 3/2005 | Nishikawa et al. | 358/1.2 |
| 2006/0023240 A1* | 2/2006 | Natori | 358/1.13 |
| 2006/0023244 A1* | 2/2006 | Mitsui | 358/1.13 |
| 2007/0216925 A1* | 9/2007 | Nakamura | 358/1.13 |
| 2010/0064211 A1* | 3/2010 | Kujirai et al. | 715/274 |

FOREIGN PATENT DOCUMENTS

| | | |
|---|---|---|
| JP | 1-175036 | 7/1989 |
| JP | 2001-034444 | 2/2001 |
| JP | 2001-34444 | 2/2001 |
| JP | 2005-018494 A | 1/2005 |
| JP | 2006-65839 | 3/2006 |

OTHER PUBLICATIONS

Japanese Office action dated Sep. 27, 2010 concerning the Japanese Patent Application No. 2006-075548.
Microsoft Corporation, "Advances in Windows Printing", WinHEC, May 7, 2004 [searched on Feb. 28, 2005, <http://www.microsoft.com/whdc/device/print/default.mxps>].
Microsoft Corporation, "XPS and Color Printing Enhancements in Microsoft Windows Vista", Dec. 2007, (http://www.microsoft.com/whdc/xps/vista_print.mspx).

* cited by examiner

*Primary Examiner* — Benny Q Tieu
*Assistant Examiner* — Marcellus Augustin
(74) *Attorney, Agent, or Firm* — Fitzpatrick, Cella, Harper & Scinto

(57) ABSTRACT

The graphics state of the second graphics data is determined when converting the first graphics data into the second graphics data and outputting the second graphics data to the second printer driver in accordance with a print instruction from the first application. Warning information is output in accordance with the determined graphics state of the second graphics data.

19 Claims, 19 Drawing Sheets

PRIOR ART

PRIOR ART

PRIOR ART

FIG. 5

```xml
<?xml version="1.0" encoding="UTF-8"?>
<psf:PrintTicket
xmlns:psf="http://schemas.microsoft.com/windows/2003/
08/printing/printschemaframework"
xmlns:xsi="http://www.w3.org/2001/XMLSchema-instance"
xmlns:xsd="http://www.w3.org/2001/XMLSchema"
version="1"
xmlns:ns0000="http://schemas.mydriver.com/"
xmlns:psk="http://schemas.microsoft.com/windows/2003/
08/printing/printschemakeywords">
<psf:ParameterInit name="psk:PageCopyCount">
   <psf:Value xsi:type="xsd:integer">1</psf:Value>
</psf:ParameterInit>
<psf:Feature name="psk:JobInputBin">
   <psf:Option name="ns0000:Upper"/>
</psf:Feature>
<psf:Feature name="psk:PageOrientation">
   <psf:Option name="psk:Portrait"/>
</psf:Feature>
<psf:Feature name="psk:PageMediaSize">
   <psf:Option name="psk:NorthAmericaLetter">
      <psf:ScoredProperty name="psk:MediaSizeX">
         <psf:Value xsi:type="xsd:integer">215900</psf:Value>
      </psf:ScoredProperty>
   <psf:ScoredProperty name="psk:MediaSizeY">
      <psf:Value xsi:type="xsd:integer">279400</psf:Value>
   </psf:ScoredProperty>
   </psf:Option>
</psf:Feature>
<psf:Feature name="psk:PageResolution">
   <psf:Option>
      <psf:ScoredProperty name="psk:ResolutionX">
         <psf:Value xsi:type="xsd:integer">600</psf:Value>
      </psf:ScoredProperty>
      <psf:ScoredProperty name="psk:ResolutionY">
         <psf:Value xsi:type="xsd:integer">600</psf:Value>
      </psf:ScoredProperty>
   </psf:Option>
</psf:Feature>
</psf:PrintTicket>
```

F I G. 9
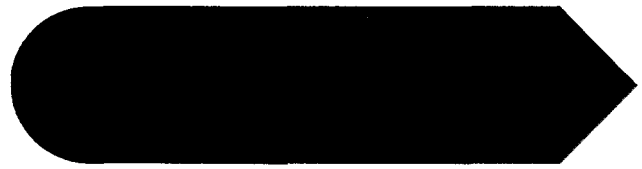

F I G. 11
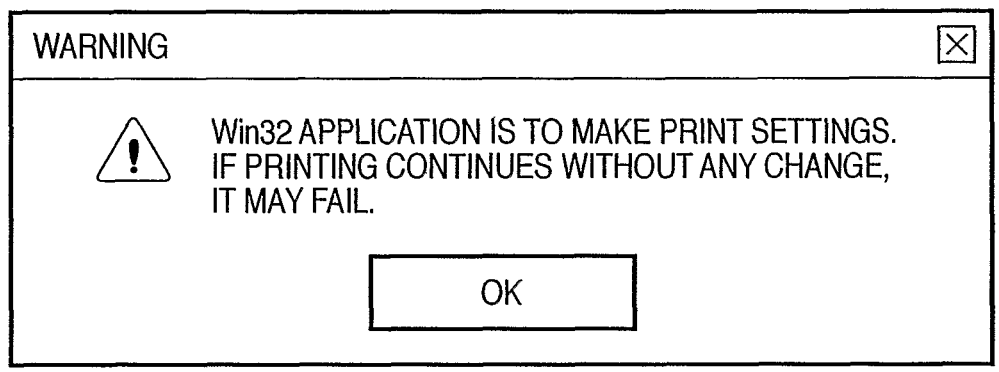

INFORMATION PROCESSING FOR GENERATING GRAPHICS DATA PROCESSIBLE BY A PRINTER

TECHNICAL FIELD

The present invention relates to an information processing apparatus in which a plurality of types of printer drivers and a plurality of types of graphics units capable of processing the respective printer drivers run, a control method therefor, and a program.

BACKGROUND ART

An application running on an operating system in a host computer generally prints using the graphics engine of the operating system and the printer driver of a destination printer. First, the application to print creates print setting information suited to the printer performance through inquiry to the printer driver. Then, the application creates graphics data based on the created print setting information, and passes it to the graphics engine. The graphics engine creates print data interpretable by the printer in cooperation with the printer driver.

Data temporarily created at this time is called a spool file. The spool file is finally formed from a set of command language data to control the printer, and is passed to a spooler. The spooler manages the spool file in a so-called "queue" so as to print even a plurality of spool files sequentially by the printer. When the printer becomes printable, the spooler sequentially reads out spool files from the queue and transmits them to the printer to print.

The graphics engine is a system which allows an application to obtain the same output result only by uniquely generating an image, regardless of hardware such as the display type, video card, printer type, or printer control language. In general, the graphics engine is provided as part of the operating system. The graphics engine is also known as an engine to implement an environment WYSIWYG ("What You See Is What You Get"). The number of graphics engines is not always one on the operating system, but may be two or more.

For example, a Microsoft Windows® operating system supports two graphics engines GDI (Graphics Device Interface) and DirectX Graphics. The conventional GDI is competent to process data which is processed by business applications such as a word processing application or spreadsheet application. To the contrary, the DirectX Graphics exists as a graphics engine which maximizes the performance of a hardware device for the real-time graphics processes of a game, multimedia title, and the like. An application can adaptively exploit these two graphics engines. However, the DirectX Graphics is a display graphics engine, and the GDI has been used as a print graphics engine for a long time.

For example, Microsoft held a hardware engineering conference WinHEC 2005 in Seattle, U.S.A., in 2005. At this conference, Microsoft announced that the latest Microsoft OS "Windows® Vista" adds a new graphics engine "WPF" (Microsoft Corporation, [Advances in Windows® Printing: TWPRO5001_WinHEC05.ppt], [online], May 7, 2004, [searched on Feb. 28, 2005], Internet, the website at microsoft.com in the subdirectory default.mspx in the subdirectory print in the subdirectory device in the subdirectory whdc). The WPF also newly adds print processes, and can adopt a new printing system in addition to printing using the conventional GDI (XPS and Color Printing Enhancements in Microsoft Windows® Vista (the website at microsoft.com in the subdirectory vista_print.mspx in the subdirectory xps in the subdirectory whdc). The WPF stands for Windows® Presentation Foundation.

A printing system inherited from a conventional Windows® utilizes a spool file "EMF" via the GDI from an application using an API called a Win32API, and creates print data by a printer driver for the GDI.

The API stands for Application Programming Interface. An application using the Win32API will be referred to as a Win32 application. The EMF stands for Enhanced Metafile. A printer driver for the GDI will be referred to as a GDI printer driver.

A printing system to print from the Win32 application via the GDI printer driver is called a GDI print path. A printing system using the WPF is called an XPS (XML Paper Specification) print path. The XPS print path is a system which creates print data by a printer driver for the WPF using a spool file "XPS" via the WPF from an application using an API called a WinFXAPI.

An application using the WinFXAPI will be referred to as a WPF application. The printer driver for the WPF will be referred to as an XPSDrv printer driver.

The use of the XPS print path instead of the conventional GDI print path has many merits such as a more advanced color process, and easy extension and high compatibility depending on the print settings of the XML formats of the XPS spool file and markup language with open specifications.

The XML stands for eXtensible Markup Language.

The GDI and XPSDrv printer drivers have different attributes. An application regards printer drivers for even the same printer as different printers. The application can use an API to determine whether the printer driver is a GDI or XPSDrv one. This API is newly added, so a conventional Win32 application cannot make any determination when printing. The user can select either driver, but it is difficult to explicitly determine whether the application is a Win32 or WPF one or whether the printer driver is a GDI or XPSDrv one. It is, therefore, difficult to print while being conscious of their difference.

The printing system using the new WPF prepares a system which converts GDI printing requested by a Win32 application into XPS printing, and a system which converts XPS printing requested by a WPF application into GDI printing. The print process can be automatically converted between the GDI and the XPS while no application is aware of this. This system allows an application developer (ISV: Independent Software Vendor) to print without being aware of whether the printer driver is a GDI or XPSDrv printer driver. This system also allows a printer driver developer (IHV: Independent Hardware Vendor) to maintain compatibility and user friendliness without preparing a GDI printer driver and XPSDrv printer driver for one printer.

However, the EMF format of the GDI and the XPS format of the WPF have different expressible ranges, so no graphics data can be completely converted between the GDI and the WPF.

Converting EMF into XPS omits graphics data by a raster operation (ROP). The ROP is rendering based on logical operation to combine three bits: a source (S) bit, a destination (D) bit, and a brush pattern (P) bit at this time before transferring a bitmap image, and determine resultant bits from the bit combination.

The ROP is used to superpose two images and make the background transparent, and is employed mainly by a Win32 application which performs presentations and image processes. The GDI renders an image by the ROP, while the WPF does not support any rendering (graphics) method based on logical operation though it has a function OpacityMask capable of designating transparency. Converting EMF data into XPS data may lose an ROP graphics image, and the user may not obtain an output result created using a Win32 application.

Converting XPS data into EMF data may omit an advanced graphics process not supported by the GDI. For example, the XPS can render the ends of a stroke path (line) with different displays (e.g., a semicircle for one end and a triangle for the other end). However, the GDI must render the two line ends with the same display and convert entire data into bitmap data.

After conversion into bitmap data, the GDI printer driver cannot recognize that rendering targets a stroke path, and may not convert print data of a printer control language into optimum data. Further, when the GDI printer driver changes the layout by scaling or the like, bitmapping enlargement jags a line edge. Although a command process can prevent degradation of the image quality, scaling may degrade the quality of the output result in processing bitmap data.

It is desirable to print without the mediacy of the system which converts GDI into XPS or XPS into GDI, but the operating system automatically converts them. To avoid the conversion, the user must determine which of the GDI and XPS attributes the application and printer driver have. In the first place, few users recognize this conversion problem, and it may fail to easily prevent the degradation of the quality of the output result or the degradation of the print quality.

A converter from GDI into XPS or from XPS into GDI is provided as a built-in part of the operating system, and no conversion logic can be externally changed. Even if the printer and printer driver are changed and further an application is changed against omission of rendering, the above-described problem may occur as long as conversion from GDI into XPS or from XPS to GDI is executed.

Print settings has print setting data in a data structure called the DEVMODE structure on the GDI print path, but has it in an XML data structure called PrintTicket on the XPS print path. Conversion from GDI into XPS or from XPS into GDI requires conversion from DEVMODE into PrintTicket or from PrintTicket into DEVMODE. Similar to graphics data, DEVMODE and PrintTicket have different expressible ranges. This process is done not automatically by the operating system but by the printer driver itself using an extended architecture. This process does not omit any data, unlike rendering, if an IHV which creates a printer driver appropriately prepares a conversion process.

DISCLOSURE OF INVENTION

The present invention has been made to overcome the conventional drawbacks, and has as its object to provide an information processing apparatus capable of warning a user before printing when it is determined that an error such as image degradation may occur depending on a graphics function for use in an environment where graphics functions with different print data generation formats coexist, a control method therefor, and a program.

According to the present invention, the foregoing object is attained by providing an information processing apparatus which operates a first graphics unit that generates first graphics data processible by a first printer driver in accordance with a print instruction from a first application, and a second graphics unit that generates second graphics data processible by a second printer driver in accordance with a print instruction from a second application, comprising:

determination means for determining a graphics state of the second graphics data when a process path is to convert the first graphics data into the second graphics data and output the second graphics data to the second printer driver in accordance with a print instruction from the first application; and output means for outputting warning information in accordance with the graphics state of the second graphics data determined by the determination means.

In a preferred embodiment, the apparatus further comprises setting means for setting a warning method when the data is converted, wherein the output means outputs warning information in accordance with the warning method set by the setting means and the graphics state of the second graphics data determined by the determination means.

In a preferred embodiment, the output means outputs a preview window of print data based on the second graphics data as the warning information, and the output means displays the preview window so as to discriminate, from a remaining area, an area in the graphics data whose graphics state is determined by the determination means to be unnatural.

In a preferred embodiment, the preview window comprises a first designation portion which designates execution of a print process of the print data, and a second designation portion which designates stop of the print process.

In a preferred embodiment, the setting means can set, as the warning method, at least one of a first setting of setting whether to output a preview window of print data based on the second graphics data, a second setting of setting whether to add a designated stamp image to print data based on the second graphics data or whether to add a designated copy-forgery-inhibited pattern image to print data based on the second graphics data, a third setting of setting whether to output a warning message or whether to inhibit printing, a fourth setting of setting whether to add designated print data to a head of print data based on the second graphics data, and a fifth setting of setting whether to notify a destination printer that the data has been converted or whether to notify the first application that the data has been converted.

In a preferred embodiment, when the determination means determines that the second graphics data contains bitmap data expressed on the basis of two, specific and arbitrary colors, or when the determination means determines that bitmap data contained in the second graphics data contains a specific object, the determination means determines that the graphics state of the second graphics data is improper, and the output means displays the second graphics data determined to be improper according to a warning method set by setting means.

In a preferred embodiment, the output means comprises first warning means for outputting a first warning when converting the first graphics data into the second graphics data and outputting the second graphics data to the second printer driver in accordance with a print instruction from the first application, and second warning means for outputting a second warning according to the warning method set by the setting means when the determination means determines that the graphics state of the second graphics data is improper.

According to the present invention, the foregoing object is attained by providing an information processing apparatus which operates a first graphics unit that generates first graphics data processable by a first printer driver in accordance with a print instruction from a first application, and a second graphics unit that generates second graphics data processible by a second printer driver in accordance with a print instruction from a second application, comprising:

designation means for designating execution of a print process;

determination means for determining whether it is a process path to convert the first graphics data into the second graphics data and output the second graphics data to the second printer driver; and display means for displaying a preview image based on the second graphics data in accordance with determination result of the determination means.

According to the present invention, the foregoing object is attained by providing a method of controlling an information processing apparatus which operates a first graphics unit that generates first graphics data processible by a first printer driver in accordance with a print instruction from a first application, and a second graphics unit that generates second graphics data processible by a second printer driver in accordance with a print instruction from a second application, comprising:

a determination step of determining a graphics state of the second graphics data when a process path is to convert the first graphics data into the second graphics data and output the second graphics data to the second printer driver in accordance with a print instruction from the first application; and an output step of outputting warning information in accordance with the graphics state of the second graphics data determined in the determination step.

According to the present invention, the foregoing object is attained by providing a method of controlling an information processing apparatus which operates a first graphics unit that generates first graphics data processible by a first printer driver in accordance with a print instruction from a first application, and a second graphics unit that generates second graphics data processible by a second printer driver in accordance with a print instruction from a second application, comprising:

a designation step of designating execution of a print process;

a determination step of determining whether it is a process path to convert the first graphics data into the second graphics data and output the second graphics data to the second printer driver; and a display step of displaying a preview image based on the second graphics data in accordance with determination result of the determination step.

According to the present invention, the foregoing object is attained by providing a computer program which is stored in a computer-readable medium and causes a computer to execute an information process which operates a first graphics unit that generates first graphics data processible by a first printer driver in accordance with a print instruction from a first application, and a second graphics unit that generates second graphics data processible by a second printer driver in accordance with a print instruction from a second application, by causing the computer to execute a determination step of determining a graphics state of the second graphics data when a process path is to convert the first graphics data into the second graphics data and output the second graphics data to the second printer driver in accordance with a print instruction from the first application, and an output step of outputting warning information in accordance with the graphics state of the second graphics data determined in the determination step.

According to the present invention, the foregoing object is attained by providing a computer program which is stored in a computer-readable medium and causes a computer to execute an information process which operates a first graphics unit that generates first graphics data processible by a first printer driver in accordance with a print instruction from a first application, and a second graphics unit that generates second graphics data processible by a second printer driver in accordance with a print instruction from a second application, by causing the computer to execute a designation step of designating execution of a print process;

a determination step of determining whether it is a process path to convert the first graphics data into the second graphics data and output the second graphics data to the second printer driver; and a display step of displaying a preview image based on the second graphics data in accordance with determination result of the determination step.

Further features of the present invention will be apparent from the following description of exemplary embodiments with reference to the attached drawings.

BRIEF DESCRIPTION OF DRAWINGS

FIG. 5 is a view showing an example of the data structure of the print ticket according to the embodiment of the present invention;

FIG. 9 is a view for explaining another example of graphics by the rendering method unique to the XPS according to the embodiment of the present invention;

FIG. 11 is a view showing an example of a warning message according to the embodiment of the present invention;

BEST MODE FOR CARRYING OUT THE INVENTION

A preferred embodiment of the present invention will now be described in detail with reference to the drawings. It should be noted that the relative arrangement of the components, the numerical expressions and numerical values set forth in the embodiment do not limit the scope of the present invention unless it is specifically stated otherwise.

Figure 1:
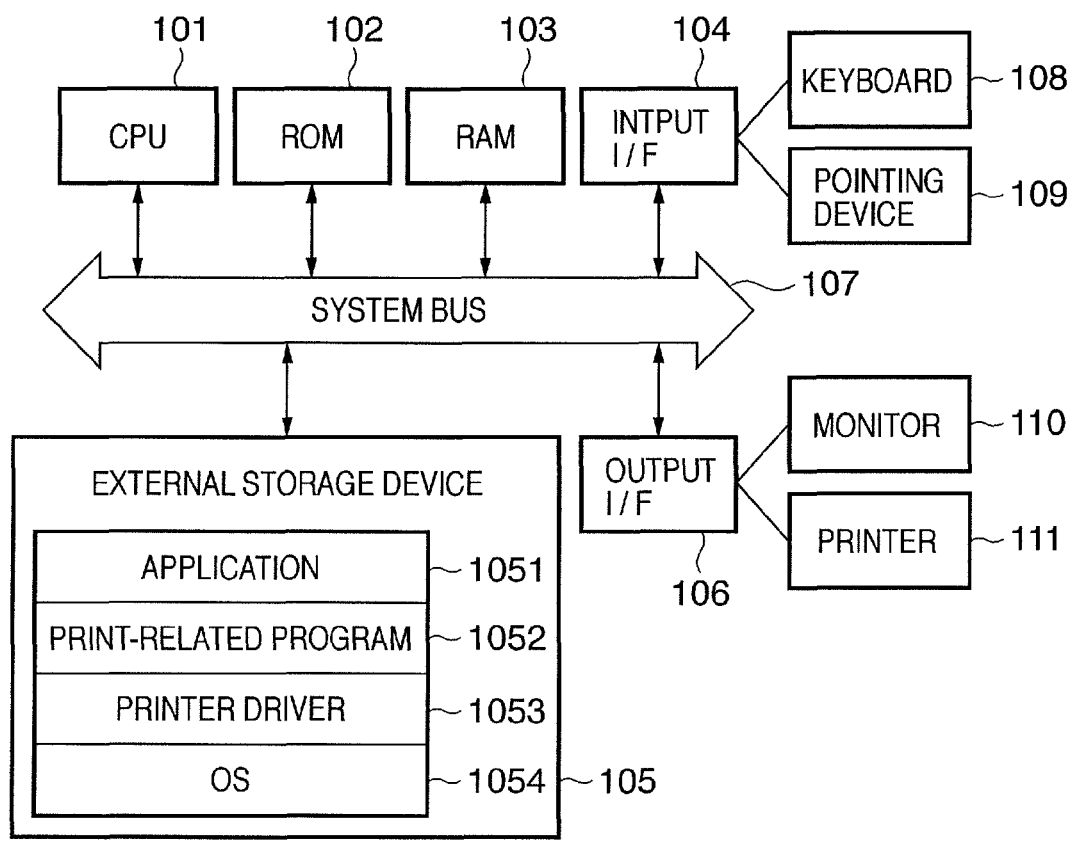
FIG. 1 is a block diagram of a printing system according to an embodiment of the present invention.

FIG. 1 is a block diagram of a printing system according to the embodiment of the present invention.

The present invention is applicable to a system having the functions of a single device or formed from a plurality of devices as far as the system can execute the functions of the present invention, unless otherwise specified. The present invention is also applicable to a system which is connected via a network such as a LAN or WAN to perform processes.

FIG. 1 is a block diagram of a printing system implemented using a general computer. A CPU 101 controls the overall system in accordance with a program stored in a ROM 102, RAM 103, or external storage device 105. The RAM 103 is also used as a work area when the CPU 101 executes various processes. The external storage device 105 stores various programs such as an application 1051, printing-related program 1052, printer driver 1053, and operating system (OS) 1054.

Input devices such as a keyboard 108 and pointing device 109 (e.g., mouse) allow a user to give various instructions to the system via an input I/F 104. An output I/F 106 is an interface for outputting data to an external device. The output I/F 106 outputs data to output devices such as a monitor 110 and printer 111. The printer 111 is not limited to a local printer, and may be connected via a network. Reference numeral 107 denotes a system bus which connects these building elements to each other to exchange data between them.

The main functional configuration of the printing system in FIG. 1 will be explained with reference to FIG. 2.

Figure 2:
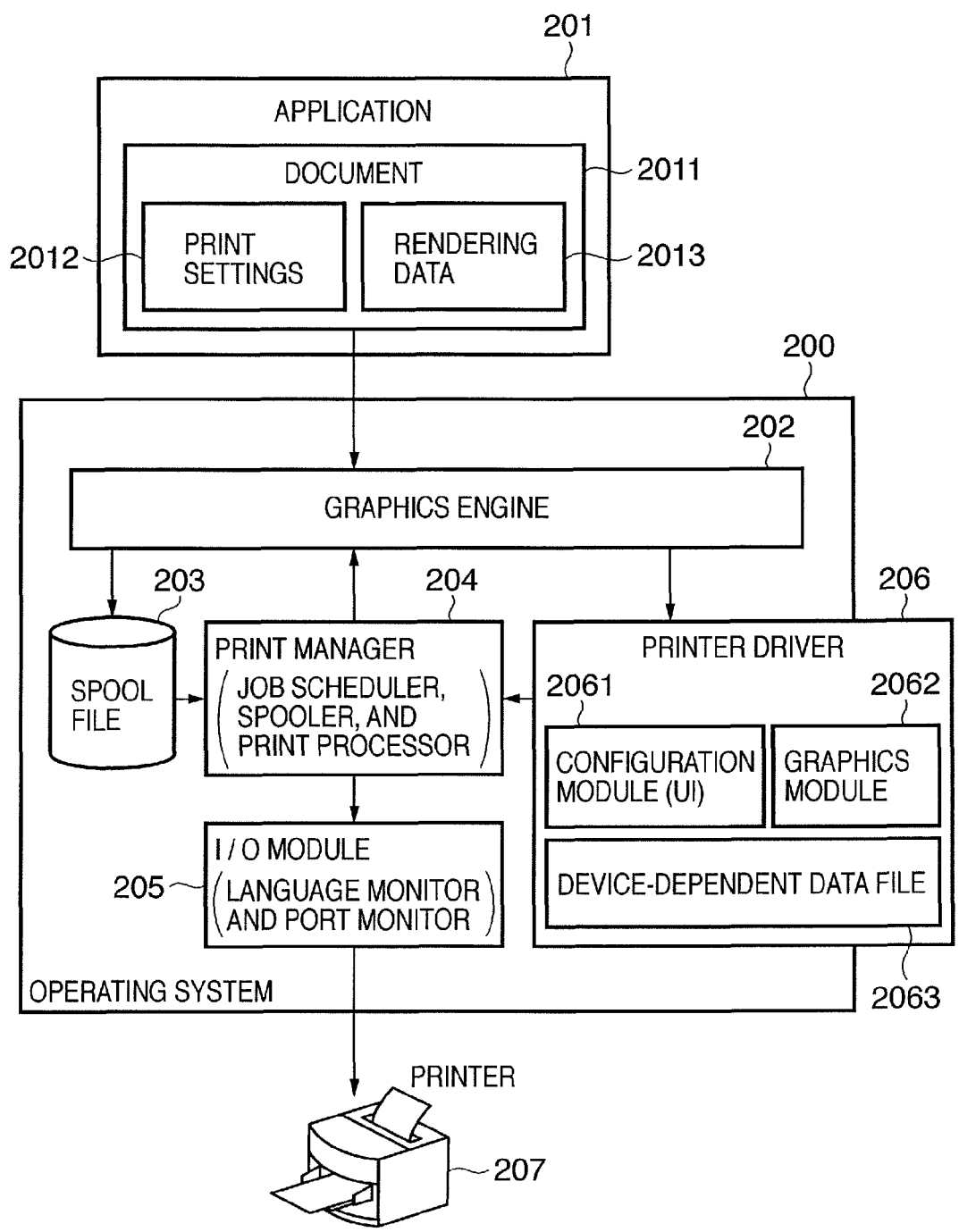
FIG. 2 is a view showing the functional configuration of the printing system according to the embodiment of the present invention.

FIG. 2 is a view showing the functional configuration of the printing system according to the embodiment of the present invention.

FIG. 2 shows the functional configuration of a printing system implemented using a general computer. The user uses an input device such as the keyboard 108 or pointing device 109 to execute a print process for a document 2011 created with an application 201 displayed on the monitor 110 serving as an output device.

After the user executes the print process, the application 201 interprets the user's print operation. Based on print settings 2012 of the document 2011 and rendering data 2013 of the document contents, the application 201 selects a printer driver 206 corresponding, to a printer 207 which is to print. Then, the application 201 notifies an operating system 200 to execute the print process.

The operating system 200 performs rendering to a spool file 203 or to the designated printer driver 206 via a graphics engine 202. A graphics module 2062 of the printer driver 206 refers to a device-dependent data file 2063 to convert data into a printer control language which is a data language interpretable by the destination printer 207.

A print manager 204 manages the schedule of print processes from respective applications. When the printer 207 becomes printable, the print manager 204 transmits print job data (printer control language) to the printer 207 via an I/O module 205. In response to this, the printer 207 prints.

A configuration module 2061 of the printer driver 206 sets the initial values of the print settings 2012 of the document 2011. The configuration module 2061 changes the set initial values of the print settings so as to obtain a final print result desired by a user based on a user operation to the user interface of the application 201 or printer driver 206.

The print settings 2012 have two formats: one is a binary data structure called DEVMODE, and the other is text data called a print ticket in a markup language using tags. The embodiment will explain an XML markup language, but the markup language is not limited to this. The markup language changes depending on the specifications of the printer driver 206 and operating system 200.

The functional configuration of the printing system when the operating system supports two graphics engines will be described with reference to FIG. 3A.

Figure 3A:
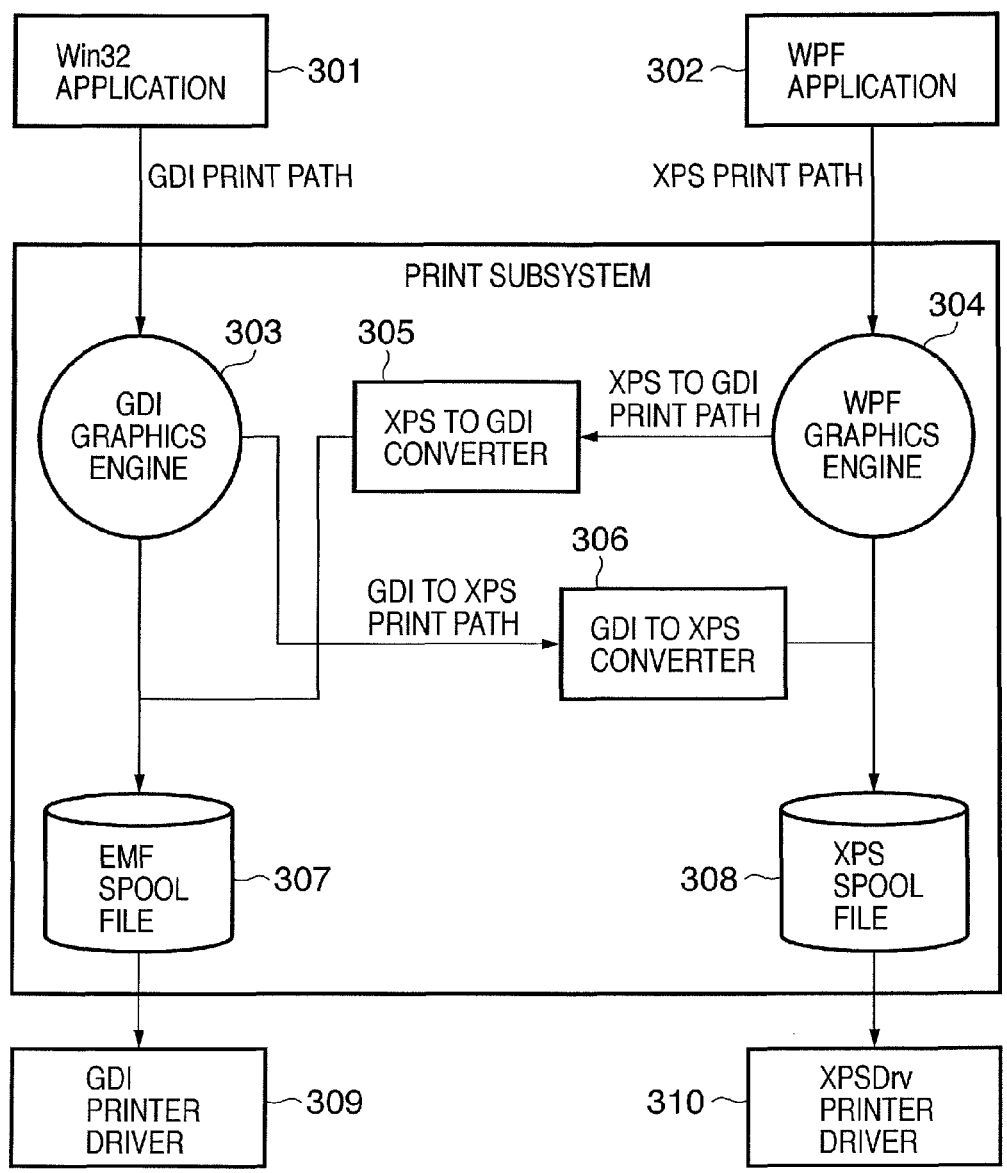
FIG. 3A is a block diagram showing the functional configuration of the printing system of an operating system having two graphics engines according to the embodiment of the present invention.

FIG. 3A is a block diagram showing the functional configuration of the printing system of the operating system having two graphics engines according to the embodiment of the present invention.

A feature of the system in which the two graphics engines coexist is to automatically convert target data between the formats of the two graphics engines in accordance with the print path. Thus, there are four print paths.

A Win32 application 301 prints via a GDI printer driver 309 by the following process. The Win32 application 301 passes a GDI function serving as graphics data to a GDI graphics engine 303. The GDI printer driver receives the graphics data as an EMF spool file 307 and converts it into the printer control language. This print path is called a GDI print path.

A WPF application 302 prints via an XPSDrv printer driver 310 by the following process. The WPF application 302 passes WPF API data to a WPF graphics engine 304. The XPSDrv printer driver 310 receives the graphics data as an XPS spool file 308 and converts it into the printer control language. This print path is called an XPS print path. The GDI and XPS print paths are generically called a straight path.

The GDI and XPS print paths are process paths executed by the general printing system in FIG. 2.

In contrast, when the Win32 application 301 is to print via the XPSDrv printer driver 310, graphics data passes through the GDI graphics engine 303 and is converted from EMF into XPS by a GDI to XPS converter 306. An XPS spool file 308 generated by the conversion is passed to the XPSDrv printer driver 310. This process path is called a GDI to XPS print path.

When the WPF application 302 is to print via the GDI printer driver 309, graphics data passes through the WPF graphics engine 304 and is converted from XPS into EMF by an XPS by a GDI converter 305. An EMF spool file 307 generated by the conversion is passed to the GDI printer driver 309. This process path is called an XPS to GDI print path. The GDI to XPS print path and the XPS to GDI print path are generically called a cross path.

The system having both the GDI graphics engine 303 and WPF graphics engine 304 incorporates converters for converting the print format between GDI and XPS. The operating system on the system automatically determines the process path of target data and properly performs necessary conversion based on the process statuses of these converters. Both the GDI printer driver 309 and XPSDrv printer driver 310 save print settings in the registry. In this case, the two printer drivers save print settings in the DEVMODE format.

The detailed arrangement of the XPSDrv printer driver 310 will be described with reference to FIG. 3B.

Figure 3B:
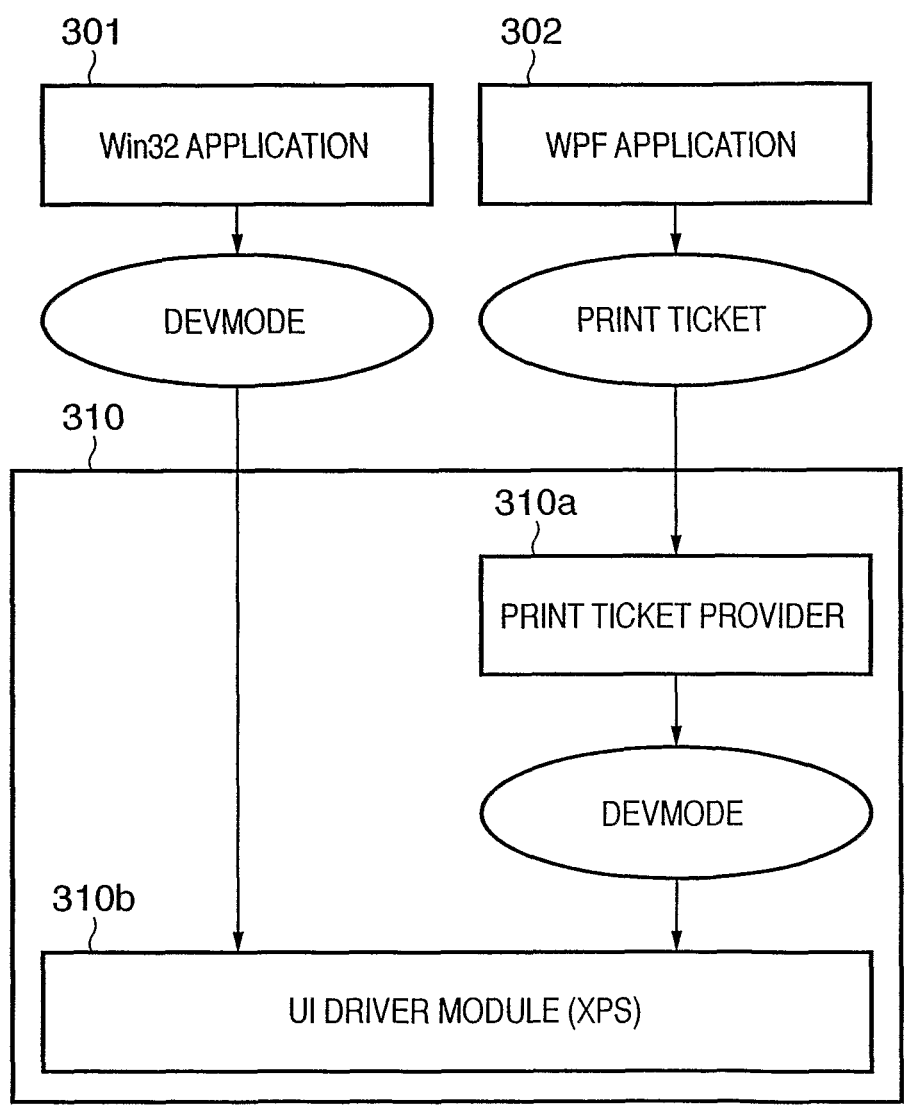
FIG. 3B is a block diagram showing the detailed arrangement of an XPSDrv printer driver according to the embodiment of the present invention.

FIG. 3B is a block diagram showing the detailed arrangement of the XPSDrv printer driver according to the embodiment of the present invention.

The XPSDrv printer driver 310 holds a print ticket provider 310a and UI driver module (XPS) 310b. The UI driver module (XPS) 310b is based on DEVMODE, and displays a UI for setting print setting information in response to a call from an application. The print ticket provider 310a converts a print ticket into DEVMODE or DEVMODE into a print ticket.

In FIG. 3B, when the Win32 application 301 requests DEVMODE for print settings, the XPSDrv printer driver 310 is based on DEVMODE and does not require any conversion. If the Win32 application 301 prints using the XPS driver, the print ticket provider 310a need not perform any conversion.

To the contrary, the WPF application 302 requests a print ticket for print settings. The XPSDrv printer driver 310 does not hold any print ticket, and the print ticket provider 310a converts the print ticket into DEVMODE.

The XPSDrv printer driver 310 can recognize the conversion process of the print ticket provider 310a. If the print ticket provider 310a converts a print ticket into DEVMODE, the XPSDrv printer driver 310 can determine that the print setting requesting side is the WPF application 302. If the print ticket provider 310a does not execute any conversion upon reception of data to be printed, the XPSDrv printer driver 310 can determine that the print setting requesting side is the Win32 application 301.

The GDI printer driver 309 is identical in structure to the XPSDrv printer driver 310, and comprises a UI driver module (GDI) equivalent to the UI driver module (XPS) 310b.

The GDI printer driver 309 can recognize the conversion process of the print ticket provider 310a, similar to the XPSDrv printer driver 310. The GDI printer driver 309 can determine the process path of data to be printed and a print setting requesting application.

If the print ticket provider 310a converts a print ticket into DEVMODE upon reception of data to be printed, the GDI printer driver 309 can also determine that the print setting requesting side is the WPF application 302. If the print ticket provider 310a does not execute any conversion, the XPSDrv printer driver 310 can determine that the print setting requesting side is the Win32 application 301.

The data structure of the DEVMODE structure will be explained with reference to FIG. 4.

Figure 4:
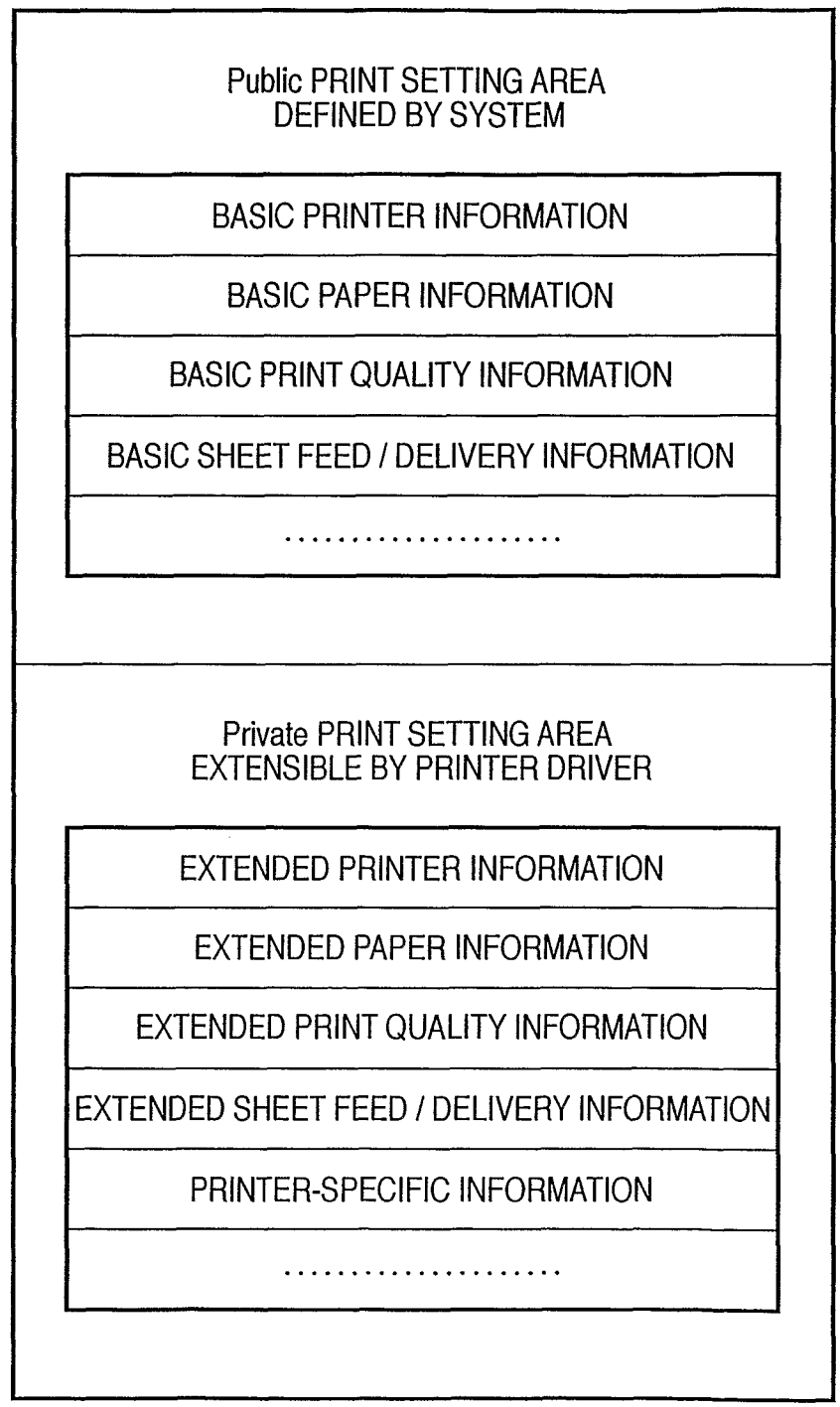
FIG. 4 is a view showing an example of the data structure of the DEVMODE structure according to the embodiment of the present invention.

FIG. 4 is a view showing an example of the data structure of the DEVMODE structure according to the embodiment of the present invention.

The GDI printer driver 309 uses the BEVMODE structure as print settings. The DEVMODE structure roughly comprises two setting areas: one is an area called a public area where common basic information defined by the operating system is set, and the other is an area called a private area freely extensible by the printer driver.

The public area opens to the public the contents of information stored in the public area as the format of an operating system, and any application can change the settings. For example, the settings can be designated from the "page setup" user interface of an application. The private area is settable by only the printer driver because the printer driver can freely extend data.

The printer driver (by a configuration module) provides a user interface (UI), allowing a user to change print settings in the extended area.

The public area of the DEVMODE structure stores basic printer information (e.g., the device name and the memory size of the entire structure) and basic paper-information (e.g., the paper size, width, and length). The public area also stores basic print-quality-information (e.g., color/monochrome and resolution) and sheet-feed/delivery-information (e.g., the feed cassette and delivery order).

The private area stores items (e.g., printer-specific functions and middleware-specific functions) which cannot be held as basic information in the public area, or printer-specific information (e.g., detailed data of contents of basic information).

The data structure of the print ticket will be described with reference to FIG. 5.

FIG. 5 is a view showing an example of the data structure of the print ticket according to the embodiment of the present invention.

The XPSDrv printer driver 310 uses the print ticket as print settings. Similar to the DEVMODE structure, the print ticket also has public and private areas. However, the two areas of the print ticket described in the XML format are not divided by a boundary, unlike DEVMODE. The two areas are discriminated by a mechanism called a namespace which defines a partition in the internal structure of tags.

The namespace is designated by each tag with a prefix, and a tag having no prefix is regarded to not belong to any namespace. The prefix is described before ":", like "psf: Feature". The print ticket in FIG. 5 has five namespaces which play different roles.

The psf namespace is a print schema framework which defines the framework of the print ticket. To provide a structure which forms a print-ticket, basic tags such as Feature, Option, and Value are defined. Feature defines functions such as the device attribute, job format settings, and other related features. Option defines accessories of a function. Value defines an element value, and ParameterInit defines setting an initial value at the same time as defining an element value.

The psk namespace defines the keyword of a print ticket in the public area. Concrete keywords are, for example, PageMediaSize which designates the paper size, and PageCopyCount which designates the number of copies.

The operating system defines and opens to the public the psf and psk namespaces as print schemas, and the application can freely arrange data based on the definitions.

The xsi and xs namespaces are generally defined as standards of the XML schema. The xsi namespace defines the built-in attribute and instance of the XML schema. The xs namespace has a default attribute of the XML schema. The ns0000 namespace is extended uniquely by the printer driver, and describes a printer driver-specific function.

The RAM 103 stores the DEVMODE structure shown in FIG. 4 and the print ticket shown in FIG. 5 as, e.g., print setting information.

A raster operation (ROP) serving as a function of the GDI graphics engine will be described with reference to FIGS. 6 and 7.

Figure 6:
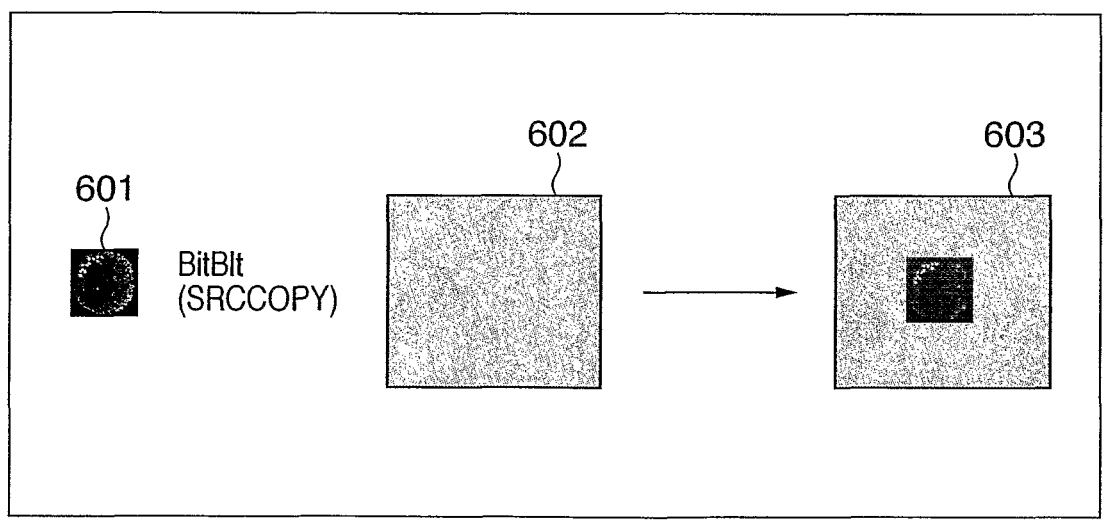
FIG. 6 is a view for explaining a raster operation by a GDI graphics engine according to the embodiment of the present invention.
Figure 7:
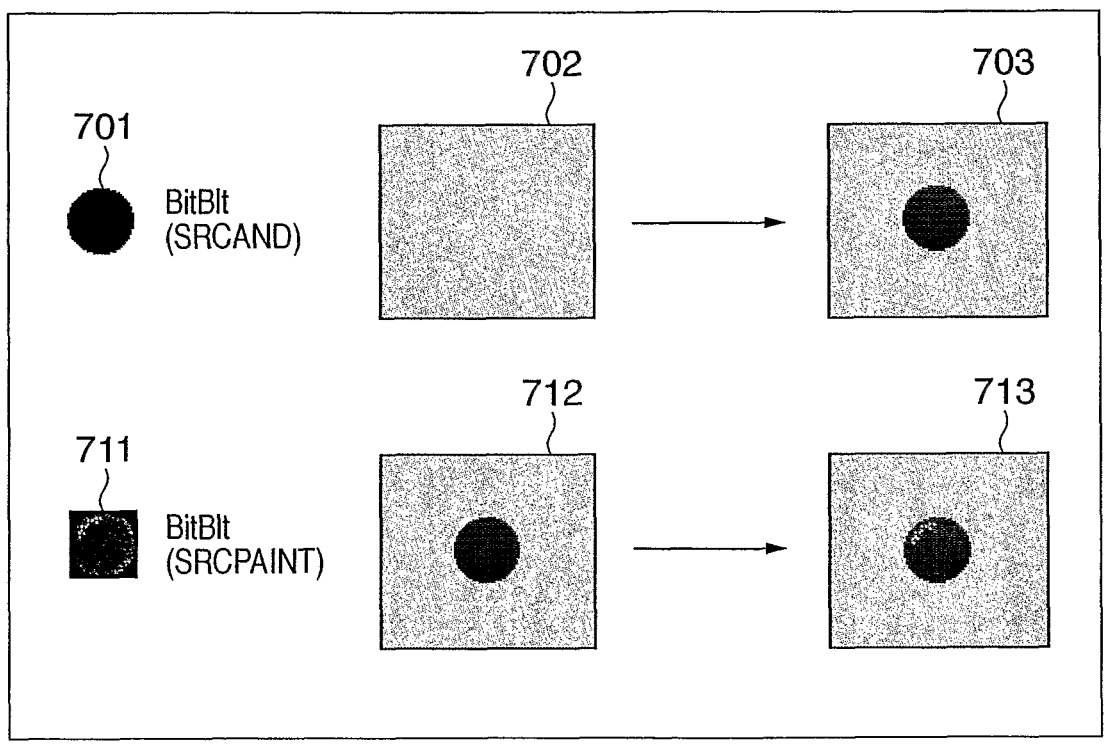
FIG. 7 is a view for explaining the raster operation by the GDI graphics engine according to the embodiment of the present invention.

FIGS. 6 and 7 are views for explaining the raster operation by the GDI graphics engine according to the embodiment of the present invention.

The ROP is rendering based on logical operation to combine three bits: a source (S) bit, a destination (D) bit, and a brush pattern (P) bit at this time before transferring a bitmap image, and determine resultant bits from the bit combination.

FIGS. 6 and 7 show results of preparing an image of a ball at the source and a gray background at the destination, and transferring a bitmap image using the ROP via an API "Bit-Blt".

In FIG. 6, a background image 602 at the destination is overwritten with ball data 601 at the source by an ROP "SRCCOPY". This rendering results in an image 603 in which even the background of the ball remains.

In FIG. 7, a mask image 701 of the ball is prepared, and data at the source and destination are logically ANDed by an ROP "SRCAND" to generate a background image 703 in which the mask part is cut out. A ball image 711 at the source and the generated background image at the destination are logically ORed by an ROP "SRCPAINT". Only the image at the source is copied to the cutout part, completing an image 713 in which only the ball image remains.

This rendering method using a combination of logical operations is the ROP, and a typical use of the ROP is the masking process. Many combinations of logical operations are possible, and there are $2^2=4$ combinations of bits for only the source and destination. The ROP is given by a combination of the four bit results, so there are $2^4=16$ ROPs (called ROP2).

Adding a brush pattern yields $2^3=8$ bit combinations, so there are $2^8=256$ ROPs (called ROP3) as combinations of results. Further, there is ROP4 which is the square of ROP3. These ROPs can implement not only copy and transparency as shown in FIGS. 6 and 7, but also cutout and reversal/mirror representation.

Attention is paid to the GDI to XPS converter 306 described with reference to FIG. 3A. The GDI to XPS converter 306 converts GDI graphics data into XPS, but there is no GDI logical operation rendering ROP in the XPS graphics format. In some cases, therefore, the GDI to XPS converter 306 cannot completely reconstruct the ROP in XPS. The XPS has a graphics format OpacityMask for transparency, which is merely a method of making an image transparent and superposing it over an image hidden below. This method is equivalent to alpha blend for the GDI and different from the ROP.

To completely reconstruct rendering of the logical operation ROP used for the purpose of mask cutout and the like, it is necessary to grasp the entire context (z order) of graphics data and execute calculation for each pixel. This work is very difficult, and the GDI to XPS converter 306 generally deletes the ROP. The operation to delete the ROP is to select an image at either the source or destination. For the mask of the ball image in FIGS. 6 and 7, only the result in FIG. 6 is obtained, omitting an image after conversion from the original image.

Figure 8:
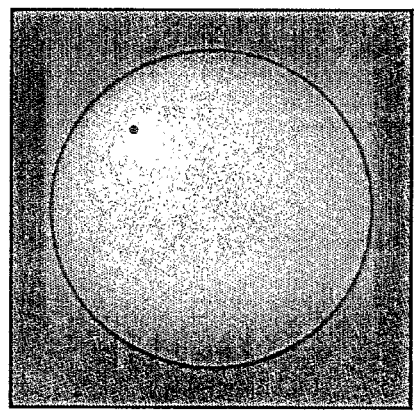
FIG. 8 is a view for explaining an example of graphics by a rendering method unique to the XPS according to the embodiment of the present invention.

The XPS to GDI converter 305 cannot satisfactorily convert data rendered by an XPS-specific rendering method into GDI. For example, in FIG. 8, rendering with an XPS RadialGradientBrush function can attach a concentrical gradation (consecutive tone expression).

Even rendering with a GDI GradientFill function can implement gradation, which is a linear gradation expressed in only the straight direction, and cannot implement an image of a concentrical gradation.

In addition, an XPS Stroke (line) function can change the shape of each line end. For example, as shown in FIG. 9, one line end is shaped into a semicircle, and the other line end is shaped into a triangle. A GDI Pen function can change the shape of a line end, but only change the two ends at the same time. Also regarding this, XPS exhibits a higher graphics representation.

However, even if highly expressive data is created, the XPS to GDI converter 305 cannot directly convert it into a GDI rendered image, and must convert it into a bitmap image. As a result, a graphics object such as a gradation image or line changes into a bitmap object.

In conversion into the printer control language, the GDI printer driver 309 cannot convert an original graphics object into an optimum command, and must handle all data as image data. Since the GDI printer driver 309 enlarges/reduces a bitmap image to change the layout by scaling, so-called jaggies occur to jag an image edge.

As described above, some printer drivers selected in printing by an application convert a spool file by the converter, failing in graphics conversion and failing to obtain an output result desired by the user. Conversion of a spool file is conversion from the EMF format to the XPS one or conversion from the XPS format to the EMF one.

The present invention will describe a configuration which, when rendered conversion fails, notifies the user of a warning to this effect, prompts him to recognize the state before printing, and provides an opportunity to determine whether to execute final printing.

The operation sequence of the printing system according to the present invention will be explained with reference to FIG. 10 prior to a description of the characteristic configuration of the printing system.

Figure 10:
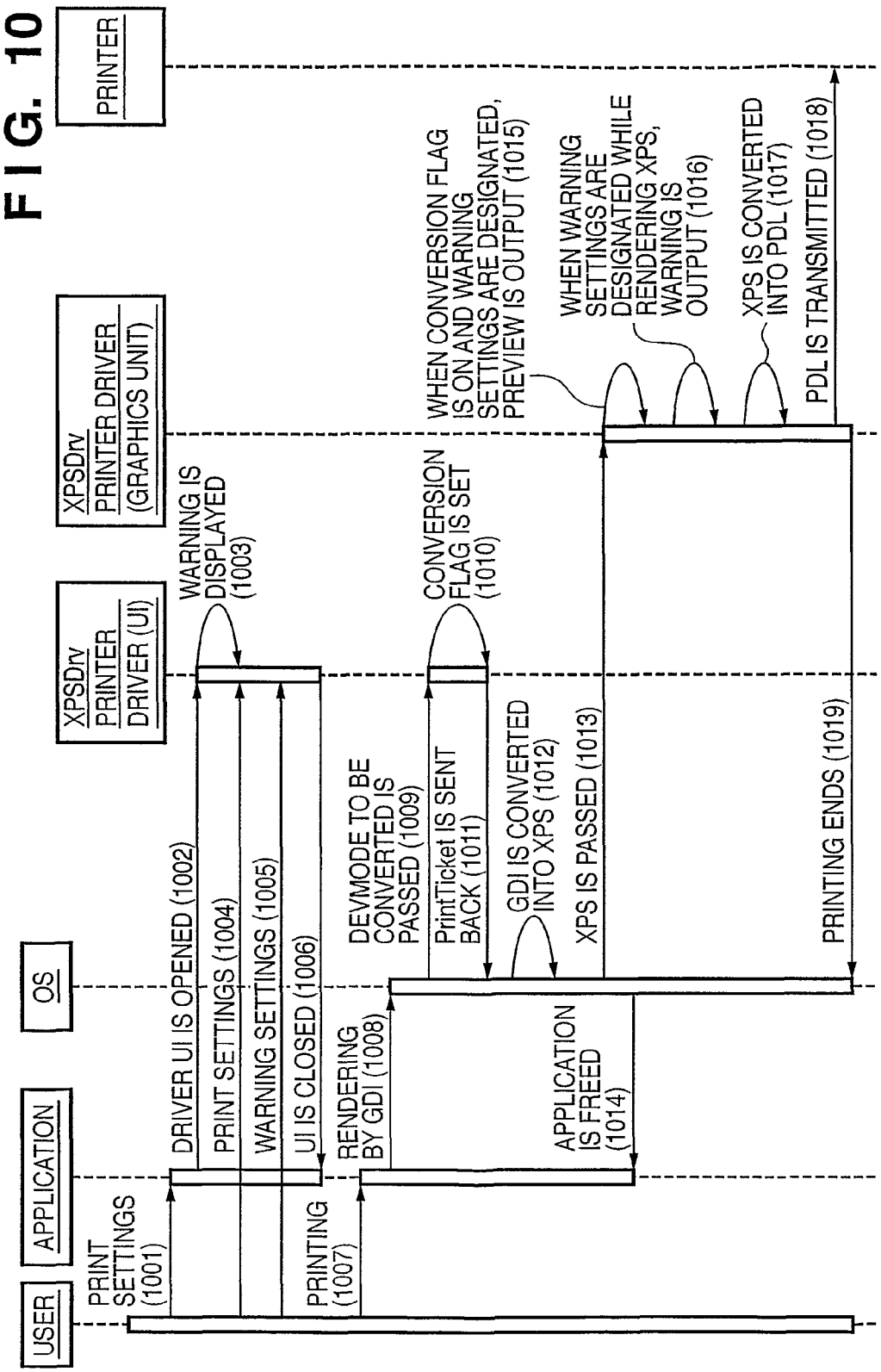
FIG. 10 is a sequence chart showing the operation sequence of the printing system according to the embodiment of the present invention.

FIG. 10 is a sequence chart showing the operation sequence of the printing system according to the embodiment of the present invention.

FIG. 10 shows an operation sequence via the GDI to XPS converter 306 when printing is done from the Win32 application 301 via the XPSDrv printer driver 310.

The user makes print settings for the Win32 application 301 (1001). The Win32 application 301 calls the configuration module of the XPSDrv printer driver 310, and opens the driver user interface (UI) of the XPSDrv printer driver 310 (1002). To make print settings, the XPSDrv printer driver 310 receives the DEVMODE structure from the Win32 application 301.

The XPSDrv printer driver 310 can print correctly only when receiving print settings of the XPS format, i.e., PrintTicket. When receiving the DEVMODE structure, the XPSDrv printer driver 310 can determine that the Win32 application 301 requests printing.

In this case, the XPSDrv printer driver 310 displays a warning message in FIG. 11 (1003). The user presses the OK button in FIG. 11 to make print settings using the driver user interface of the XPSDrv printer driver 310 (1004).

The user interface of the XPSDrv printer driver 310 in the embodiment allows making warning settings in graphics conversion in a warning setting window 1200 (FIG. 12) (1005). More specifically, when receiving the DEVMODE structure, the XPSDrv printer driver 310 determines that the print path is a cross path, and generates the first warning. If the XPSDrv printer driver 310 determines by processes (to be described with reference to FIGS. 14 and 17) that a graphics error will occur, it generates the second warning.

FIG. 10 shows the XPSDrv printer driver 310 as a main controller. The process changes when the GDI printer driver 309 serves as a main controller. For example, when receiving a print ticket, the GDI printer driver 309 determines that the print path is a cross path, and generates the first warning. If the GDI printer driver 309 determines by processes (to be described with reference to FIGS. 14 and 18) that a graphics error will occur, it generates the second warning.

The warning setting window 1200 will be described with reference to FIG. 12.

Figure 12:
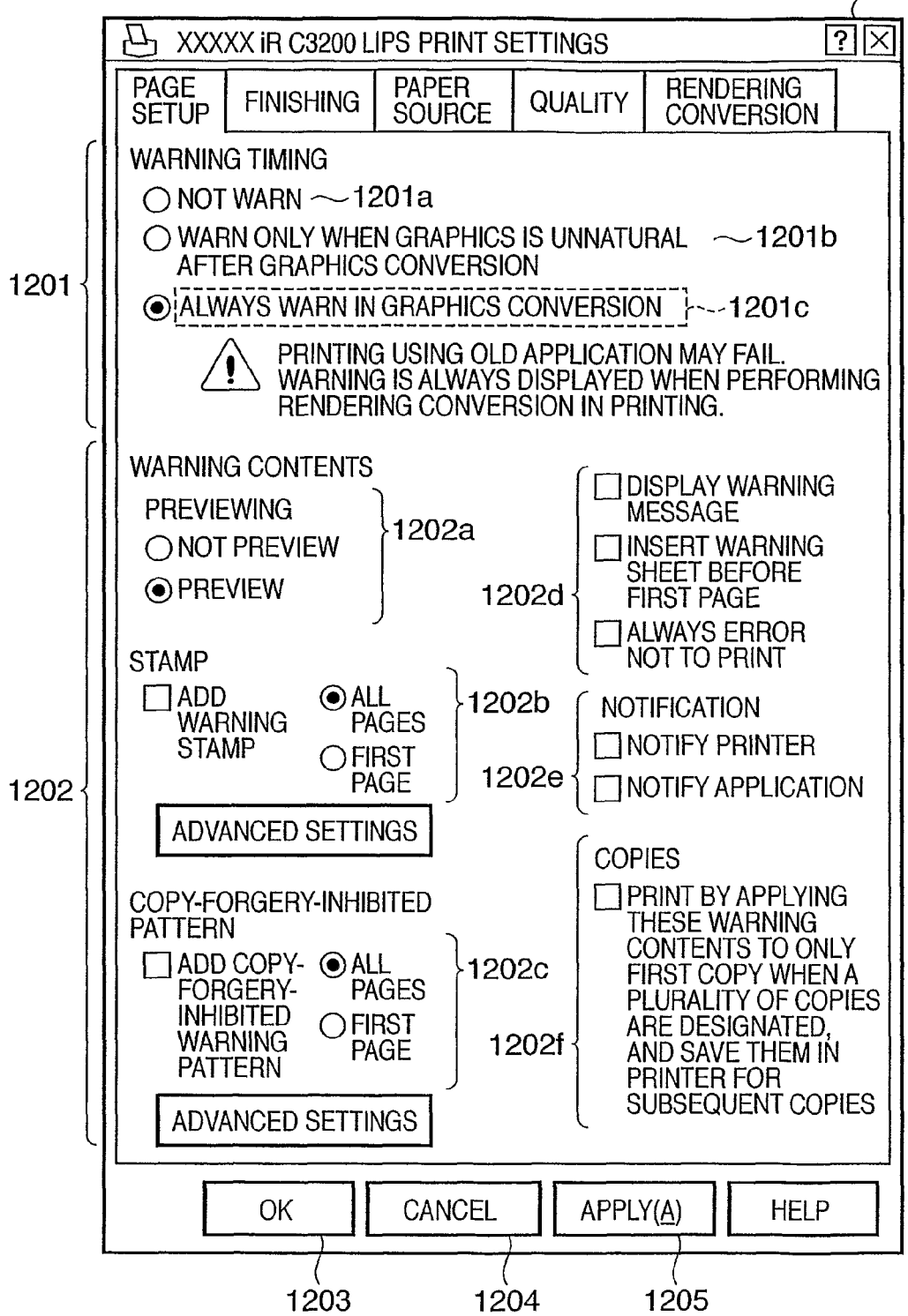
FIG. 12 is a view showing an example of a warning setting window according to the embodiment of the present invention.

FIG. 12 is a view showing an example of the warning setting window according to the embodiment of the present invention.

The warning setting window has various controls (radio buttons, check boxes, and the like) for setting a warning method.

The type of warning is roughly divided into two, "warning timing" (item 1201) and "warning contents" (item 1202).

The warning timing determines when a warning is generated in graphics conversion. The user can select one of three types "not warn" (item 1201a), "warn only when rendering is unnatural after graphics conversion" (item 1201b), and "always warn in graphics conversion" (item 1201c).

The warning contents represent an operation to be executed in graphics conversion. The warning contents have a field 1202a to designate whether to "forcibly display a preview and prompt the user to confirm it" in graphics conversion, and a field 1202b to designate whether to "forcibly add a stamp to printed data".

The warning contents have a field 1202c to designate whether to "forcibly add a copy-forgery-inhibited pattern (which is a faint pattern printed on paper and appears as latent characters upon copying to mainly inhibit copy forgery) to printed data". The warning contents have a field 1202d to designate whether to "display a warning message in printing", "insert a sheet bearing a word of warning before the first page of printed data", and "always error not to print".

The warning contents have a field 1202e to designate settings on a notification such as "notify a printer that graphics conversion has been done" or "notify an application that graphics conversion has been done".

The warning contents have a field 1202f to designate settings in printing a plurality of copies. The field 1202f is associated with a function of, when printing a plurality of copies, generating a warning at the time of only the first copy according to a warning method based on various warning settings described above, and then holding the warning in the storage area of a printer without printing the warning.

In FIG. 12, "always warn in graphics conversion" and "preview" are selected.

If the user operates an OK button 1203 in this state, the setting state (warning setting information) in FIG. 12 is stored as part of print setting information in, e.g., the RAM 103, and the display of the warning setting window 1200 disappears. If the user operates a cancel button 1204, the setting state in FIG. 12 is canceled, and the display of the warning setting window 1200 disappears.

If the user operates an apply button 1205, the setting state in FIG. 12 is temporarily stored as warning setting information in the RAM 103, and the warning setting window 1200 is kept displayed. If necessary, the user can continue the warning setting operation.

Referring back to FIG. 10, the configuration module (UI) of the XPSDrv printer driver 310 saves both print settings and warning settings in the DEVMODE structure, and closes the user interface (1006).

Figure 13:
FIG. 13 is a view showing an example of an image to be printed according to the embodiment of the present invention.

The user designates printing based on the created DEVMODE structure (1007). The application is the Win32 application 301, which performs rendering using the GDI graphics engine 303 (1008). For example, an image shown in FIG. 13 is to be printed. Upon reception of the rendering instruction, the operating system recognizes rendering to the XPSDrv printer driver 310, and starts a process by the GDI to XPS converter 306.

The XPSDrv printer driver 310 converts the DEVMODE structure of print settings into PrintTicket. The XPSDrv printer driver 310 calls the configuration module (UI) in the XPSDrv printer driver 310, and passes the DEVMODE structure to it (1009).

The configuration module converts the DEVMODE structure into PrintTicket, and at the same time, adds a conversion flag representing "conversion from the DEVMODE structure" to PrintTicket (1010). In this case, the configuration module adds Feature "ns000:JobConvert" to PrintTicket by Option "ns000:On". The XPSDrv printer driver 310 sends back the generated PrintTiicket to the GDI to XPS converter 306 (1011).

The GDI to XPS converter 306 converts the GDI rendering instruction into XPS (1012). When graphics data contains an ROP, the ROP process is lost. For example, a world map serving as a background image in the target image of FIG. 13 is rendered by a mask ROP. This part of the background image cannot be converted into a well-masked transparent image, and an image is rendered directly over the background image.

The GDI to XPS converter 306 passes XPS obtained by the conversion process to the XPSDrv printer driver 310 (1013). At this timing, the Win32 application 301 is freed from the print process (1014), and is available for the next process.

The XPSDrv printer driver 310 executes a process for the received XPS by the graphics unit (graphics module), and executes various warning processes in accordance with warning setting information.

For example, when the conversion flag in PrintTicket is ON and warning setting information designates previewing of warning contents, the XPSDrv printer driver 310 outputs a rendered image as a preview (1015).

When the conversion flag in PrintTicket is ON and warning setting information designates output of a warning message, the XPSDrv printer driver 310 outputs a warning message (dialog) (1016).

After that, the XPSDrv printer driver 310 converts XPS into PDL (1017), and transmits the converted PDL to the printer (1018). In response to this, the print end notification is transmitted to the operating system, and the process ends (1019). In this way, when a flag representing conversion from DEVMODE is set in the print ticket, the XPSDrv printer driver 310 can determine that the print requesting side is the Win32 application 301. In this case, a graphics error, degradation of the print function, and the like are conceivable, so the XPSDrv printer driver 310 determines whether to warn in accordance with settings in FIG. 12.

Details of the process (1015 to 1017 in FIG. 10) by the graphics unit (graphics module) of the XPSDrv printer driver 310 will be explained with reference to FIG. 14.

Figure 14:
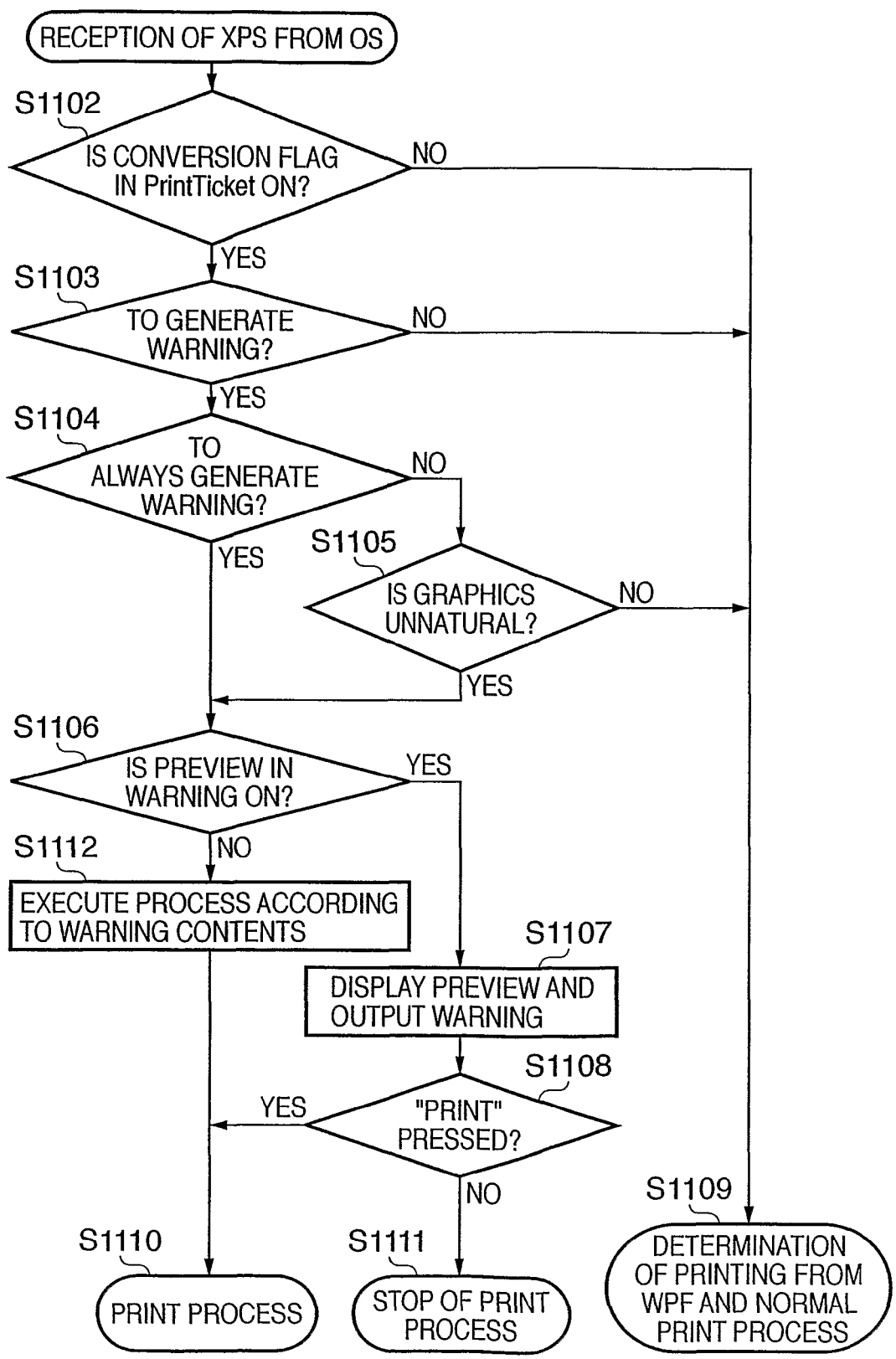
FIG. 14 is a flowchart showing details of a process by the graphics unit of an XPSDrv printer driver according to the embodiment of the present invention.

FIG. 14 is a flowchart showing details of the process by the graphics unit of the XPSDrv printer driver according to the embodiment of the present invention.

After receiving XPS, the XPSDrv printer driver 310 determines whether the conversion flag of "ns000:JobConvert" in PrintTicket of print settings is ON (step S1102). By this step, the XPSDrv printer driver 310 can recognize whether GDI to XPS conversion has been done.

If the conversion flag in PrintTicket is OFF (NO in step S1102), the XPSDrv printer driver 310 determines that the WPF application 302 requests printing, and executes a normal print process (step S1109). That is, if the XPSDrv printer driver 310 determines that the print requesting side is the WPF application 302, it executes the print process without particularly performing any warning process because it can determine that neither a graphics error nor degradation of the print function occurs.

If the conversion flag is ON (YES in step S1102), the XPSDrv printer driver 310 determines the presence/absence and conditions of a warning by referring to Feature describing "warning timing" in PrintTicket (step S1103).

If no warning is to be generated (NO in step S1103), the XPSDrv printer driver 310 determines that the WPF application 302 requests printing, and executes a normal print process (step S1109). If a warning is to be generated (YES in step S1103), the XPSDrv printer driver 310 determines, as a warning condition, whether to always warn (step S1104). If the warning condition is to always warn (YES in step S1104), the process advances to step S1106.

If the warning condition is not to always warn (NO in step S1104), it is to "warn only when rendering is unnatural after graphics conversion". Under this warning condition, the XPSDrv printer driver 310 determines whether an image rendered by the graphics unit is unnatural (step S1105).

That is, the XPSDrv printer driver 310 converts a GDI function into WPF API data in accordance with a print instruction from the Win32 application 301. When outputting the WPF API data to the XPSDrv printer driver 310, the XPSDrv printer driver 310 determines the graphics state of the WPF API data. If the XPSDrv printer driver 310 determines that graphics is natural (NO in step S1105), it determines that the WPF application 302 requests printing, and executes a normal print process (step S1109). If graphics is unnatural (YES in step S1105), the process advances to step S1106.

In step S1105, it is determined whether graphics in conversion from GDI into XPS is unnatural. More specifically, it is determined whether there is the trace of deleting any ROP. It is impossible to determine whether all ROPs have been deleted. However, most ROPs are used for a masking process, so it is determined that graphics is unnatural when detecting, for example, an "image rendered in a single, black or white color with a bitmap periphery".

The color is limited to black or white because masking in logical operation by the ROP process requires a single, black or white color. Even this determination method cannot strictly determine whether any ROP has been deleted, and is merely determination logic to warn.

Figure 17:
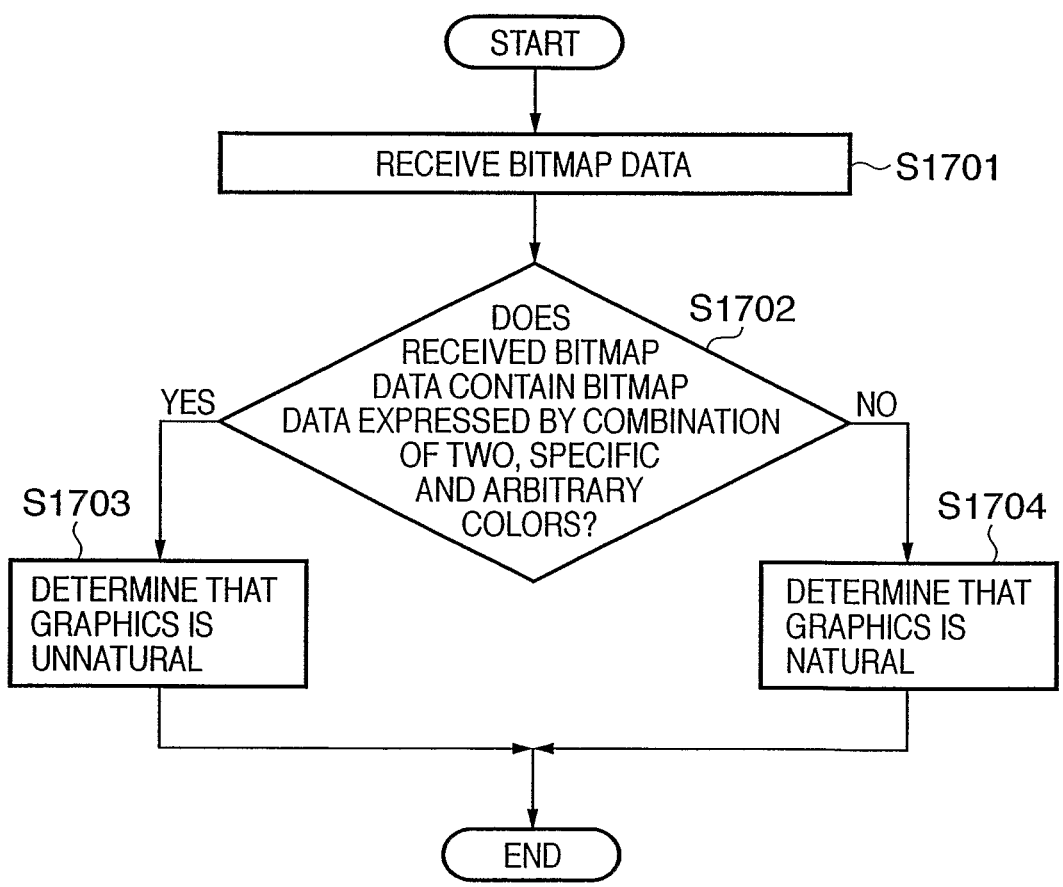
FIG. 17 is a flowchart showing a graphics error analysis sequence according to the embodiment of the present invention.

Details of the process in step S1105 will be described with reference to FIG. 17.

The XPSDrv printer driver 310 analyzes XPS bitmap data received via the graphics unit (step S1701).

The XPSDrv printer driver 310 determines whether the received XPS contains bitmap data expressed by a combination of two, specific and arbitrary colors (step S1702).

More specifically, the XPSDrv printer driver 310 determines whether the received XPS contains bitmap data formed from a combination of black and an arbitrary color or that of white and an arbitrary color.

If the XPSDrv printer driver 310 determines that the received XPS contains bitmap data expressed by a combination of two, specific and arbitrary colors (YES in step S1702), it determines that the received XPS is unnatural (step S1703). Then, the process advances to step S1106.

If the XPSDrv printer driver 310 determines that the received XPS does not contain bitmap data expressed by a combination of two, specific and arbitrary colors (NO in step S1702), it determines that the received XPS is natural (step S1704). The XPSDrv printer driver 310 generates print data interpretable by the printer without executing any warning display process.

In this manner, the XPSDrv printer driver 310 determines that the graphics state is improper when determining that WPF API data contains bitmap data expressed by a combination of two, specific and arbitrary colors. This process is executed before printing to present the process result to the user. Before executing the print process, the user can recognize that a graphics error will occur.

After the process in step S1104 or S1105, the XPSDrv printer driver 310 determines whether the preview in warning is ON as warning contents, in order to determine whether to display a preview in warning. That is, the XPSDrv printer driver 310 determines whether the user designates "preview" (preview is ON) in the field 1202a of the warning setting window 1200 in FIG. 12.

If the preview in warning is OFF (NO in step S1106), the XPSDrv printer driver 310 executes various processes in accordance with items set in the warning content field 1202 of the warning setting window 1200 in FIG. 12 (step S1112). Various processes include display of a warning message, insertion of a warning sheet, a stamp process, a copy-forgery-inhibited pattern process, and a notification process. Based on the warning contents and the process results, the XPSDrv printer driver 310 executes the print process (step S1110) or stops it (step S111).

If the preview in warning is ON (YES in step S1106), the XPSDrv printer driver 310 outputs the preview window (FIG. 15) of a rendered image (step S1107). In other words, the XPSDrv printer driver 310 outputs warning information in accordance with the graphics state of WPF API data determined in S1105.

The XPSDrv printer driver 310 determines whether the user has pressed the print button in the preview window. If the user has pressed the print button (YES in step S1108), the XPSDrv printer driver 310 executes the print process. If the user presses the stop button (NO in step S1108), the XPSDrv printer driver 310 stops the print process (step S111).

A concrete example of the process in FIG. 14 will be described.

In the embodiment, "always warn in graphics conversion" (field 1201c) is selected in FIG. 12. Thus, the XPSDrv printer driver 310 does not determine whether graphics is unnatural, and the process advances from step S1104 to S1106 to warn.

Since "preview" is selected in FIG. 12, the XPSDrv printer driver 310 outputs a preview image (FIG. 15) based on the received XPS spool file (step S1107).

The preview window which outputs the preview image will be explained with reference to FIG. 15.

Figure 15:
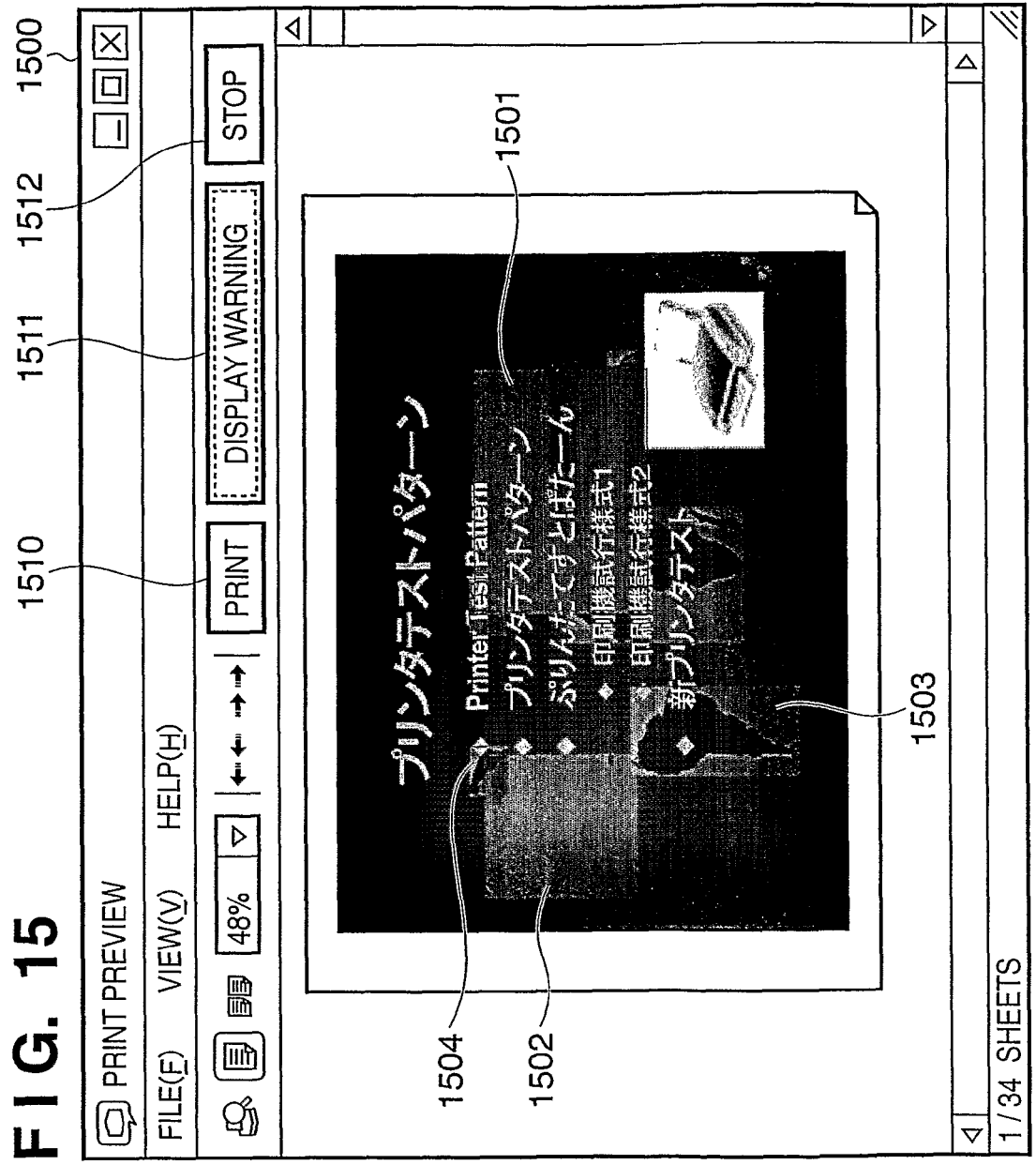
FIG. 15 is a view showing an example of a preview window according to the embodiment of the present invention.

FIG. 15 is a view showing an example of the preview window according to the embodiment of the present invention.

In generating a preview window 1500, it is determined whether "graphics is unnatural" for an image to be printed. If there are unnatural areas; they are displayed with rectangular frames 1501 to 1504 of a predetermined color (e.g., red) in order to discriminate these areas from the remaining area.

More specifically, bitmap data expressed by a combination of two, specific and arbitrary colors is regarded as an unnatural area and displayed with a rectangular frame of a predetermined color around the bitmap data. This bitmap data is, for example, one expressed by a combination of black and an arbitrary color or a combination of white and an arbitrary color.

Before finally executing printing, the user can easily identify an area where graphics (printing) may be unnatural. The rectangular frame can be cyclically displayed or not displayed every time the user presses a warning display button 1511.

When permitting printing with the display contents, the user can execute the print process by pressing a print button 1510. To stop printing, the user can stop the print process by pressing a stop button 1512.

In the preview window 1500, the mask image of the world map on the background of FIG. 13 is changed into a black cutout image of single-color bitmap data because the ROP is deleted. This image area is displayed with the rectangular frame 1501 of the predetermined color, warning the user.

If the user designates "always warn in graphics" (field 1202*a*) in the warning setting window 1200 (FIG. 12), the preview window 1500 is always displayed before the print process. If the user designates "warn only when graphics is unnatural after graphics conversion" (field 1201*b*), the preview window 1500 is displayed when even one part of the entire print job is determined to be unnatural. The process shown in FIG. 17 is executed when selecting "warn only when graphics is unnatural after graphics conversion".

In either case, the first page containing an area determined to be unnatural is first previewed. If the user cannot attain desired printing, he can stop printing at this point by pressing the stop button 1512 in the preview window 1500.

Figure 16:
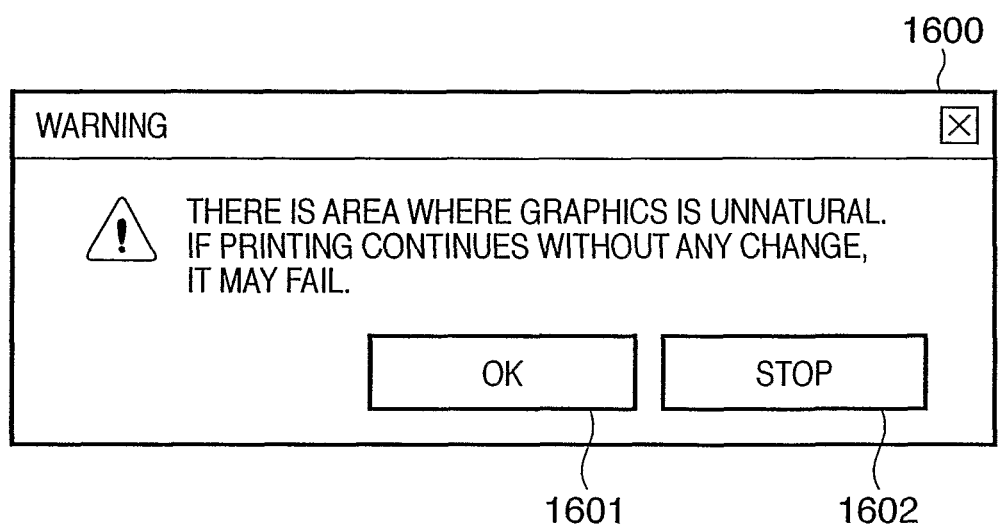
FIG. 16 is a view showing an example of a warning message according to the embodiment of the present invention.

If the user designates "not preview" and "display a warning message", a warning message 1600 (FIG. 16) is displayed instead of the preview window 1500. The user can stop printing by pressing a stop button 1602 in the warning message 1600. To continue printing, the user presses an OK button 1601.

If the user selects "add a warning stamp" (field 1202*b*) or "forcibly add a copy-forgery-inhibited warning pattern" (field 1202*c*), an image such as a stamp or copy-forgery-inhibited pattern selected by the user is forcibly added to a printed document. After actual printing, the user can be warned that there is an area where graphics is unnatural. It can also be designated whether to add a selected image to only the first page or all pages.

If the user selects "insert a warning sheet before the first page" (field 1202*d*), a word of warning of one page is printed on a sheet before a printed document. In other words, print data to print a word of warning is added at the head of target print data.

If the user selects "always error not to print" (field 1202*d*), an error is announced after graphics conversion without actual printing, i.e., the print process is inhibited.

If the user selects "notify a printer" (field 1202*e*), the printer driver notifies the destination printer that graphics conversion has been done (warning event). When detecting the warning event, the printer can recognize that the print job has undergone graphics conversion. The printer can temporarily store the received print job in the queue without immediately printing it, and hold printing in wait for an instruction.

If the user selects "notify an application" (field 1202*e*), the printer driver notifies the application that graphics conversion has been done. When receiving the warning event from the printer driver, the application changes a printer driver for use, and can print without causing graphics conversion.

The warning conditions and warning method defined in the warning setting window 1200 of FIG. 12 can be arbitrarily combined and set. The user can freely select the type of warning against deterioration in graphics conversion. These warnings are generated only when performing graphics conversion, and do not influence printing from the Win32 application by the GDI printer driver or printing from the WPF application by the XPSDrv printer driver.

Conversion from XPS into GDI follows logic reverse to the above one. That is, when converting PrintTicket into DEVMODE, a conversion flag representing conversion from PrintTicket is set ON in the private area of DEVMODE. DEVMODE holds warning setting information. As described above, contents which can be expressed by XPS but not by GDI cannot be completely converted and become unnatural as a result of graphics conversion by the XPS to GDI converter. In this case, the main controller is the GDI printer driver 309.

That is, the WPF outputs WPF API data in accordance with a print instruction from the WPF application 302. The XPS to GDI converter 305 converts the WPF API data into a GDI function, and outputs the GDI function to the GDI printer driver 309. The GDI printer driver 309 determines the graphics state of the GDI function. A detailed determination method will be described with reference to FIG. 18. The GDI printer driver 309 outputs warning information in accordance with the determined graphics state of the GDI function.

As described above, the GDI printer driver 309 receives all graphics data generated by the WinFX application as bitmap images. Hence, the GDI printer driver 309 determines that a "case of receiving a bitmap image in a single color or a relatively small number of colors" is unnatural.

The GDI printer driver 309 can also determine a "case in which a bitmap image contains a black edge" or a "case in which a single-color edge in a bitmap image is continuous with an adjacent graphic" is unnatural. In many cases, the printer driver is notified of a line object as a graphic command. However, the printer driver is notified of all objects as a bitmap image in conversion from XPS into GDI, and the bitmap data may contain a line object. The GDI printer driver 309 also determines this case to be unnatural.

Figure 18:
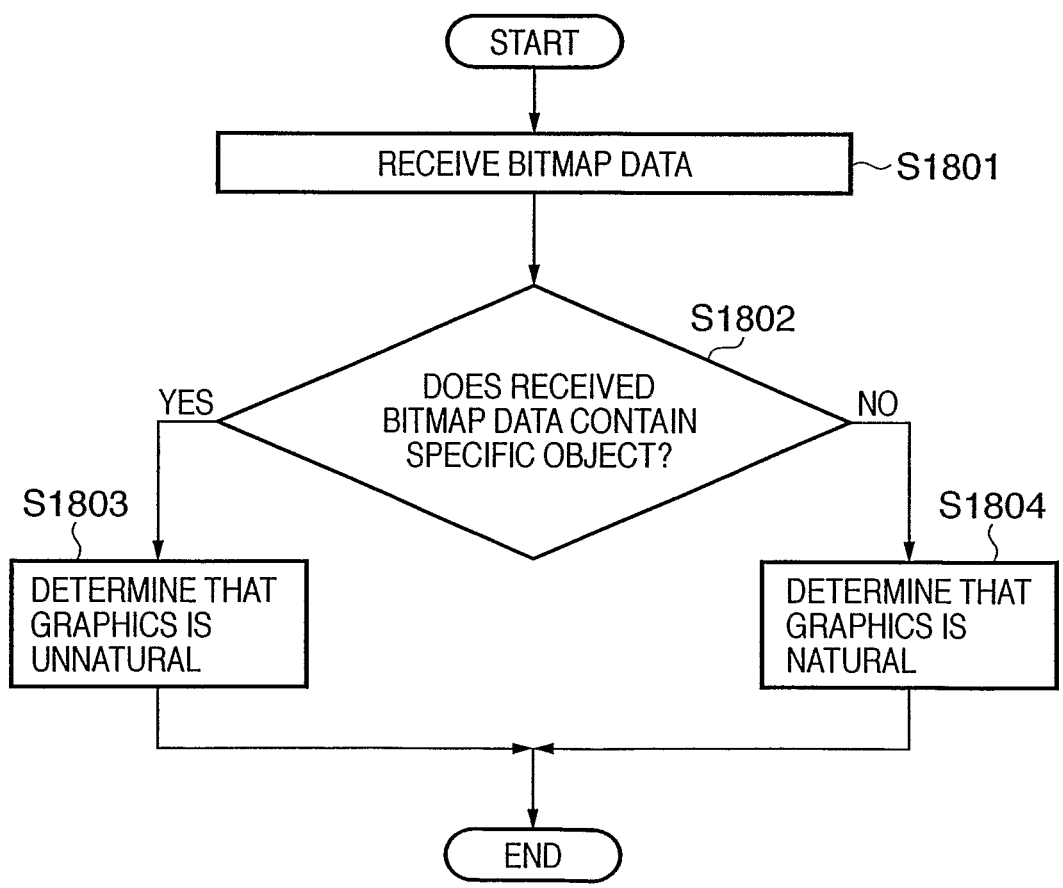
FIG. 18 is a flowchart showing a graphics error analysis sequence according to the embodiment of the present invention.

A process when the GDI printer driver 309 determines that graphics is unnatural will be described with reference to FIG. 18.

The GDI printer driver 309 receives bitmap data (step S1801). The GDI printer driver 309 determines whether the received bitmap data contains a specific object (step S1802). A typical example of the specific object is a line object. In other words, if the GDI printer driver 309 detects a line object in the bitmap data, it determines that graphics is unnatural (step S1803).

If the GDI printer driver 309 determines that the bitmap data does not contain any specific object, it determines that graphics is natural (step S1804). Then, the GDI printer driver 309 executes a normal print process.

If the GDI printer driver 309 determines that the bitmap data contained in the GDI function contains a specific object, it determines that the graphics state of the GDI function is improper, and can warn the user. This process is executed before printing to present the process result to the user. Before executing the print process, the user can recognize that a graphics error will occur.

It is determined that such bitmap data results in unnatural graphics, based on a theory that this simple graphics hardly uses bitmap data but generally uses an instruction for a stroke (line), square, or circle.

By generating a warning, similar to conversion from GDI into XPS, even the GDI driver can display a warning on the preview in graphics conversion and print a warning.

This can prompt the user to recognize that graphics conversion has been done, and can guide him to printing free from any image degradation.

As described above, according to the embodiment, the user can confirm a printer driver optimum for a graphics engine for use by an application in printing, and can prevent printing which omits image information. Even if an image is omitted upon printing, the user can notice that image information is omitted due to graphics conversion, and can recognize an error quickly.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-075548, filed on Mar. 17, 2006, which is hereby incorporated by reference herein in its entirety.

The invention claimed is:

1. An information processing apparatus comprising:
    a reception unit configured to receive, from a user before designation of printing, a selection of a specific print setting which is a setting for displaying an image of a page, the selection being selected in a setting window of a software program;
    a control unit configured to start displaying of an image of a page according to a first print setting received by the software program after the designation of printing in a case where the reception unit received the selection of the specific print setting and a first application selected the software program; and
    wherein the control unit is further configured to execute a process of the software program according to a second print setting received by the software program without displaying a new image of a page according to the second print setting in a case where the reception unit received the selection of the specific print setting and a second application selected the software program,
    wherein the first print setting includes a conversion flag indicating that a print setting is converted.

2. The apparatus according to claim 1, wherein the first application is an application which passes WPF API data to a WPF graphics engine, and the second application is an application which passes a GDI function serving as graphics data to a GDI graphics engine.

3. The apparatus according to claim 1, wherein the image of the page according to the first print setting is displayed in a preview window in a case where the reception unit received the selection of the specific print setting—and the first application selected the software program, and the preview window has a print button to execute a print process.

4. The apparatus according to claim 1,
    wherein the specific print setting is a preview setting,
    wherein the image of the page according to the first print setting is a preview image of the page, and
    wherein the software program is a printer driver.

5. The apparatus according to claim 1,
    wherein the setting window is a print setting window, and
    wherein the process is a print process.

6. The apparatus according to claim 1,
    wherein the designation of printing is designated by a user after the completion of the print setting.

7. The apparatus according to claim 1, wherein the specific print setting is a setting which always warns in rendering conversion and warning contents are a preview.

8. A method of controlling an information processing apparatus comprising:
    a reception step of receiving, from a user before designation of printing, a selection of a specific print setting which is a setting for displaying an image of a page, the selection being selected in a setting window of a software program;
    a control step of starting displaying of an image of a page according to a first print setting received by the software program after the designation of printing in a case where the reception step received the selection of the specific print setting and a first application selected the software program; and
    wherein the control step executes a process of the software program according to a second print setting received by the software program without displaying a new image of a page according to the second print setting in a case where the reception step received the selection of the specific print setting and a second application selected the software program, wherein the first print setting includes a conversion flag indicating that a print setting is converted.

9. The method according to claim 8, wherein the first application is an application which passes WPF API data to a WPF graphics engine, and the second application is an application which passes a GDI function serving as graphics data to a GDI graphics engine.

10. The method according to claim 8, wherein the image of the page according to the first print setting is displayed in a preview window in a case where the reception step received the selection of the specific print setting and the first application selected the software program, and the preview window has a print button to execute a print process.

11. The method according to claim 8,
wherein the specific print setting is a preview setting,
wherein the image of the page according to the first print setting is a preview image of the page, and
wherein the software program is a printer driver.

12. The method according to claim 8,
wherein the setting window is a print setting window, and
wherein the process is a print process.

13. The method according to claim 8,
wherein the designation of printing is designated by a user after the completion of the print setting.

14. A non-transitory computer-readable storage medium on which is stored a computer program which causes a computer to execute a reception step of receiving, from a user before designation of printing, a selection of a specific print setting which is a setting for displaying an image of a page after designation of printing, the selection being selected in a setting window of a software program;

a control step of starting of an image of a page according to a first print setting received by the software program after designation of printing in a case where the reception step received the selection of the specific print setting and a first application selected the software program; and wherein the control step executes a process of the software program according to a second print setting received by the software program without displaying a new image of a page according to the second print setting in a case where the reception step received the selection of the specific print setting and a second application selected the software program, wherein the first print setting includes a conversion flag indicating that a print setting is converted.

15. The non-transitory computer-readable storage medium according to claim 14, wherein the first application is an application which passes WPF API data to a WPF graphics engine, and the second application is an application which passes a GDI function serving as graphics data to a GDI graphics engine.

16. The non-transitory computer-readable storage medium according to claim 14, wherein the image of the page according to the first print setting is displayed in a preview window in a case where the reception step received the selection of the specific print setting and the first application selected the software program, and the preview window has a print button to execute a print process.

17. The non-transitory computer-readable storage medium according to claim 14,
wherein the specific print setting is a preview setting,
wherein the image of the page according to the first print setting is a preview image of the page, and
wherein the software program is a printer driver.

18. The non-transitory computer-readable storage medium according to claim 14,
wherein the setting window is a print setting window, and
wherein the process is a print process.

19. The non-transitory computer-readable storage medium according to claim 14,
wherein the designation of printing is designated by a user after the completion of the print setting.

* * * * *